United States Patent
Hill et al.

(10) Patent No.: US 10,611,939 B2
(45) Date of Patent: Apr. 7, 2020

(54) COATED ABRASIVE ARTICLE

(71) Applicant: 3M INNOVATIVE PROPERTIES COMPANY, St. Paul, MN (US)

(72) Inventors: Philip S. Hill, Leicestershire (GB); Polly H. R. Keen, Warwickshire (GB); James R. Smith, Staffordshire (GB); Thomas A. Beard, Staffordshire (GB)

(73) Assignee: 3M Innovative Properties Company, St. Paul, MN (US)

( * ) Notice: Subject to any disclaimer, the term of this patent is extended or adjusted under 35 U.S.C. 154(b) by 8 days.

(21) Appl. No.: 15/773,232

(22) PCT Filed: Nov. 4, 2016

(86) PCT No.: PCT/US2016/060455
§ 371 (c)(1),
(2) Date: May 3, 2018

(87) PCT Pub. No.: WO2017/079513
PCT Pub. Date: May 11, 2017

(65) Prior Publication Data
US 2018/0320038 A1    Nov. 8, 2018

(30) Foreign Application Priority Data
Nov. 4, 2015  (GB) .................................. 1519508.4

(51) Int. Cl.
*B24D 11/00*  (2006.01)
*C09K 3/14*   (2006.01)
*B24D 3/34*   (2006.01)
*B24D 3/02*   (2006.01)
*B24D 3/00*   (2006.01)
*B24D 18/00*  (2006.01)

(52) U.S. Cl.
CPC ............ *C09K 3/1436* (2013.01); *B24D 3/344* (2013.01); *B24D 11/00* (2013.01)

(58) Field of Classification Search
USPC .................................................... 51/293, 297
See application file for complete search history.

(56) References Cited

U.S. PATENT DOCUMENTS

| 4,751,138 A | 6/1988 | Tumey |
| 4,828,583 A | 5/1989 | Oxman |
| 4,973,338 A * | 11/1990 | Gaeta ..................... B24D 3/004 51/295 |

(Continued)

FOREIGN PATENT DOCUMENTS

| CN | 1377916 | 11/2002 |
| EP | 1826257 | 8/2007 |

(Continued)

OTHER PUBLICATIONS

International Search Report for PCT International Application No. PCT/US2016/060455, dated Feb. 8, 2017, 5 pages.

*Primary Examiner* — James E McDonough

(57) ABSTRACT

An abrasive article (100) comprising a backing (102); a make resin (112) contacting the backing (102); abrasive particles (114) contacting the make resin (112); and a size resin (116) contacting both the abrasive particles (114) and the make resin (112), wherein the make resin (112) includes an alkyl quaternary ammonium clay, which can take the form of Garamite.

1 Claim, 1 Drawing Sheet

(56) References Cited

U.S. PATENT DOCUMENTS

| | | |
|---|---|---|
| 5,549,962 A | 8/1996 | Holmes |
| 5,700,302 A | 12/1997 | Stoetzel |
| 2004/0024102 A1 | 2/2004 | Hayes |
| 2007/0224362 A1* | 9/2007 | Briand .................... C04B 28/04 |
| | | 427/427.4 |
| 2009/0298993 A1 | 12/2009 | Kosinski |

FOREIGN PATENT DOCUMENTS

| | | | |
|---|---|---|---|
| EP | 1826257 A1 * | 8/2007 | .......... B24D 11/001 |
| GB | 2378706 | 8/2003 | |
| WO | WO 1998-12021 | 3/1998 | |
| WO | WO 2008-045270 | 4/2008 | |
| ZA | 9800016 | 7/1996 | |

* cited by examiner

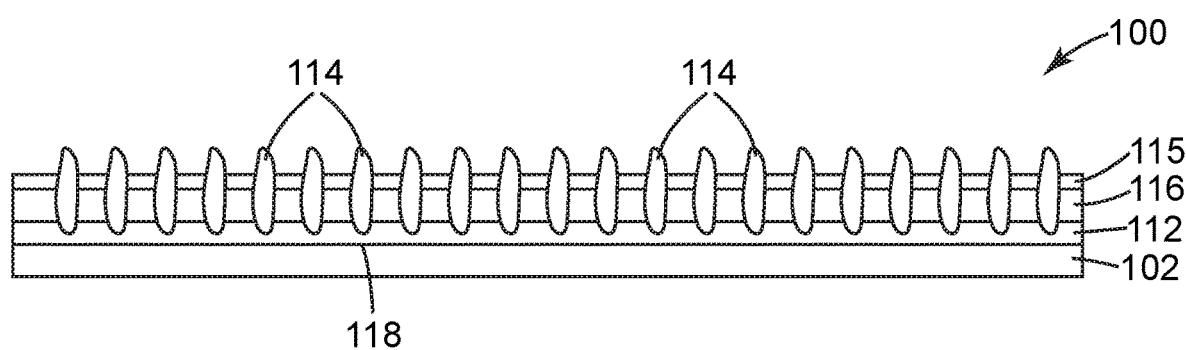

US 10,611,939 B2

COATED ABRASIVE ARTICLE

CROSS REFERENCE TO RELATED APPLICATIONS

This application is a national stage filing under 35 U.S.C. 371 of PCT/US2016/060455, filed Nov. 4, 2018, which claims the benefit of GB Application No. 1519508.4, filed Nov. 4, 2015, the disclosure of which is incorporated by reference in its/their entirety herein.

The present invention relates to coated abrasive articles and methods of making the same. More particularly, it relates to coated abrasive articles having a make coat modified to deliver improved anchoring of the mineral therein.

Coated abrasive articles are commonly used for abrading, grinding and polishing operations in both commercial and industrial applications. These operations are conducted on a wide variety of substrates, including wood, wood-like materials, plastics, fiberglass, soft metals, enamel surfaces, and painted surfaces. Some coated abrasives can be used in either wet or dry environments. In wet environments, common applications include filler sanding, putty sanding, primer sanding and paint finishing.

In general, these abrasive articles include a paper or polymeric backing on which abrasive particles are adhered. The abrasive particles may be adhered using one or more tough and resilient binders to secure the particles to the backing during an abrading operation. In a manufacturing process, these binders are often processed in a flowable state to coat the backing and the particles, and then subsequently hardened to lock in a desired structure and provide the finished abrasive product.

In a common construction, the backing has a major surface that is first coated with a "make" coat. Abrasive particles are then deposited onto the make layer such that the particles are at least partially embedded in the make coat. The make layer is then hardened (e.g., crosslinked) to secure the particles. Then, a second layer called a "size" layer is coated over the make layer and abrasive particles and also hardened. The size layer further stabilizes the particles and also enhances the strength and durability of the abrasive article. Optionally, additional layers may be added to modify the properties of the coated abrasive article.

The make coat is typically hardened either by thermal-curing or ultraviolet-curing. Ultraviolet (UV) curing has the advantage of being rapid but can carry an increased cost of manufacture. Thermal-curing takes longer but can deliver a more cost effective manufacturing process.

A coated abrasive article can be evaluated based on certain performance properties. First, such an article should have a desirable balance between cut and finish—that is, an acceptable efficiency in removing material from the workpiece, along with an acceptable smoothness of the finished surface. Second, an abrasive article should also avoid excessive "loading", or clogging, which occurs when debris or swarf become trapped between the abrasive particles and hinder the cutting ability of the coated abrasive. Third, the abrasive article should be both flexible and durable to provide for longevity in use.

It is recognized that the alignment of the abrasive mineral can be key to achieving the desired cut and finish. Such alignment is ensured in the UV curing process by curing the make coat immediately, or at the very least shortly after, the mineral is applied to the make coat. However, maintaining alignment of the mineral during the thermal-curing process is more problematic due to the considerably longer period of time that the mineral is supported by the make coat before the coat hardens.

It is therefore known for the mineral to fall out of alignment before or during the thermal curing process which can negatively impact the performance of the abrasive product.

It is an object of the invention to at least mitigate some of the above problems.

According to the invention there is provided an abrasive article in accordance with the claims.

The invention will now be described with reference to the following drawing:

FIG. 1 is a cross-sectioned side view of an abrasive article according to the present invention.

An abrasive article according to one exemplary embodiment is shown in FIG. 1 and is designated by the numeral 100. As shown, the abrasive article 100 includes a backing 102. The abrasive article 100 has a layer of make resin 112 (also known as the make coat) that is deposited onto the backing 102 along an interface 118. The make resin 112 coats the backing 102, thereby forming a base layer on the backing 102.

A plurality of abrasive particles 114 are in part embedded in the make resin 112 and generally extend in directions away from the backing 102. The particles 114 are generally in registration with the make resin 112.

A size resin 116 contacts both the make resin 112 and the particles 114 and extends on and around both the make resin 112 and the particles 114. The size resin 116 is generally in registration with both the make resin 112 and the particles 114.

While the particles 114 are described here as being "generally in registration" with the make resin 112, it is to be understood that the particles 114 themselves are discrete in nature and have small gaps located between them. Therefore, the particles 114 do not cover the entire area of the underlying make resin 112. Conversely, it is to be understood that while the size resin 116 is "in registration" with make resin 112 and the particles 114, size resin 116 can optionally extend over a slightly oversized area compared with that covered by the make resin 112 and particles 114. In the embodiment shown, the make resin 112 is fully encapsulated by the size resin 116, the particles 114, and the backing 102.

The abrasive article 100 may further include an optional supersize resin 115 as is known in the art.

Preferably and as shown, the backing 102 is uniform in thickness and generally flat. A backing 102 with a generally uniform thickness is preferred to alleviate stiffness variations and improve conformability of the article 100 to the workpiece.

Backings

The backing 102 may be constructed from various materials known in the art for making coated abrasive articles, including sealed coated abrasive backings and porous non-sealed backings. Preferably, the thickness of the backing generally ranges from about 0.02 to about 5 millimeters, more preferably from about 0.05 to about 2.5 millimeters, and most preferably from about 0.1 to about 0.4 millimeters, although thicknesses outside of these ranges may also be useful.

The backing may be made of any number of various materials including those conventionally used as backings in the manufacture of coated abrasives. Exemplary flexible backings include polymeric film (including primed films) such as polyolefin film (e.g., polypropylene including biaxially oriented polypropylene, polyester film, polyamide film, cellulose ester film), metal foil, mesh, foam (e.g., natural sponge material or polyurethane foam), cloth (e.g., cloth made from fibers or yarns comprising polyester, nylon, silk, cotton, and/or rayon), scrim, paper, coated paper, vulcanized paper, vulcanized fiber, nonwoven materials, combinations thereof, and treated versions thereof. The backing may also be a laminate of two materials (e.g., paper/film, cloth/paper, film/cloth). Cloth backings may be woven or stitch bonded. In some embodiments, the backing is a thin and conformable polymeric film capable of expanding and contracting in transverse (i.e. in-plane) directions during use. Preferably, a strip of such a backing material that is 5.1 centimeters (2 inches) wide, 30.5 centimeters (12 inches) long, and 0.102 millimeters (4 mils) thick and subjected to a 22.2 Newton (5 Pounds-Force) dead load longitudinally stretches at least 0.1%, at least 0.5%, at least 1.0%, at least 1.5%, at least 2.0%. at least 2.5%, at least 3.0%, or at least 5.0%, relative to the original length of the strip. Preferably, the backing strip longitudinally stretches up to 20%, up to 18%, up to 16%, up to 14%, up to 13%, up to 12%, up to 11%, or up to 10%, relative to the original length of the strip. The stretching of the backing material can be elastic (with complete spring back), inelastic (with zero spring back), or some mixture of both. This property helps promote contact between the abrasive particles 114 and the underlying substrate, and can be especially beneficial when the substrate includes raised and/or recessed areas.

Highly conformable polymers that may be used in the backing 102 include certain polyolefin copolymers, polyurethanes, and polyvinyl chloride. One particularly preferred polyolefin copolymer is an ethylene-acrylic acid resin (available under the trade designation "PRIMACOR 3440" from Dow Chemical Company, Midland, Mich.). Optionally, ethylene-acrylic acid resin is one layer of a bilayer film in which the other layer is a polyethylene terephthalate (PET) carrier film. In this embodiment, the PET film is not part of the backing 102 itself and is stripped off prior to using the abrasive article 100.

The choice of backing material may depend on the intended application of the coated abrasive article. The thickness and smoothness of the backing should also be suitable to provide the desired thickness and smoothness of the coated abrasive article, wherein such characteristics of the coated abrasive article may vary depending, for example, on the intended application or use of the coated abrasive article.

The backing may, optionally, have at least one of a saturant, a presize layer and/or a backsize layer. The purpose of these materials is typically to seal the backing and/or to protect yarn or fibers in the backing. If the backing is a cloth material, at least one of these materials is typically used. The addition of the presize layer or backsize layer may additionally result in a 'smoother' surface on either the front and/or the back side of the backing. Other optional layers known in the art may also be used, as described in U.S. Pat. No. 5,700,302 (Stoetzel et al.).

Abrasive Particles

Suitable abrasive particles for the coated abrasive article 100 include any known abrasive particles or materials useable in abrasive articles. For example, useful abrasive particles include fused aluminum oxide, heat treated aluminum oxide, white fused aluminum oxide, black silicon carbide, green silicon carbide, titanium diboride, boron carbide, tungsten carbide, titanium carbide, diamond, cubic boron nitride, garnet, fused alumina zirconia, sol gel abrasive particles, silica, iron oxide, chromia, ceria, zirconia, titania, silicates, metal carbonates (such as calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, aluminum trihydrate, graphite, metal oxides (e.g., tin oxide, calcium oxide), aluminum oxide, titanium dioxide) and metal sulfites (e.g., calcium sulfite), and metal particles (e.g., tin, lead, copper).

It is also possible to use polymeric abrasive particles formed from a thermoplastic material (e.g., polycarbonate, polyetherimide, polyester, polyethylene, polysulfone, polystyrene, acrylonitrile-butadiene-styrene block copolymer, polypropylene, acetal polymers, polyvinyl chloride, polyurethanes, nylon), polymeric abrasive particles formed from crosslinked polymers (e.g., phenolic resins, aminoplast resins, urethane resins, epoxy resins, melamine-formaldehyde, acrylate resins, acrylated isocyanurate resins, urea-formaldehyde resins, isocyanurate resins, acrylated urethane resins, acrylated epoxy resins), and combinations thereof. Other exemplary abrasive particles are described, for example, in U.S. Pat. No. 5,549,962 (Holmes et al.).

The abrasive particles typically have an average diameter of from about 0.1 to about 1000 micrometers. Coating weights for the abrasive particles may depend, for example, on the binder precursor used, the process for applying the abrasive particles, and the size of the abrasive particles, but typically range from about 5 to about 1350 grams per square meter.

Size Resins

Any of a wide selection of size resins 116 known in the art may be used to secure the abrasive particles 114. The resins 116 typically include one or more binders.

Typically, binders are formed by curing (e.g., by thermal means, or by using electromagnetic or particulate radiation) a binder precursor. Useful binder precursors are known in the abrasive art and include, for example, free-radically polymerizable monomer and/or oligomer, epoxy resins, acrylic resins, epoxy-acrylate oligomers, urethane-acrylate oligomers, urethane resins, phenolic resins, urea-formaldehyde resins, melamine-formaldehyde resins, aminoplast resins, cyanate resins, or combinations thereof. Useful binder precursors include thermally curable resins and radiation curable resins, which may be cured, for example, thermally and/or by exposure to radiation.

Exemplary radiation cured crosslinked acrylate binders are described in U.S. Pat. No. 4,751,138 (Tumey, et al.) and U.S. Pat. No. 4,828,583 (Oxman, et al.).

Curatives

Any of the make resin, size resin, and supersize resin described above optionally include one or more curatives. Curatives include those that are photosensitive or thermally sensitive, and preferably comprise at least one free-radical polymerization initiator and at least one cationic polymerization catalyst, which may be the same or different. In order to minimize heating during cure, while preserving pot-life of the binder precursor, the binder precursors employed in the present embodiment are preferably photosensitive, and more preferable comprise a photoinitiator and/or a photocatalyst.

Fillers

The abrasive coatings described above optionally comprise one or more fillers. Fillers are typically organic or inorganic particulates dispersed within the resin and may, for example, modify either the binder precursor or the properties of the cured binder, or both, and/or may simply, for example, be used to reduce cost. In coated abrasives, the fillers may be present, for example, to block pores and passages within the backing, to reduce its porosity and provide a surface to which the maker coat will bond effectively. The addition of a filler, at least up to a certain extent, typically increases the hardness and toughness of the cured binder. Inorganic particulate filler commonly has an average particle size ranging from about 1 micrometer to about 100 micrometers, more preferably from about 5 to about 50 micrometers, and sometimes even from about 10 to about 25 micrometers. Depending on the ultimate use of the abrasive article, the filler typically has a specific gravity in the range of 1.5 to 4.5, and an average particle size of the filler will preferably be less than the average particle size of the abrasive particles. Examples of useful fillers include: metal carbonates such as calcium carbonate (in the form of chalk, calcite, marl, travertine, marble or limestone), calcium magnesium carbonate, sodium carbonate, and magnesium carbonate; silicas such as quartz, glass beads, glass bubbles and glass fibers; silicates such as talc, clays, feldspar, mica, calcium silicate, calcium metasilicate, sodium aluminosilicate, sodium-potassium alumina silicate, and sodium silicate; metal sulfates such as calcium sulfate, barium sulfate, sodium sulfate, aluminum sodium sulfate, and aluminum sulfate; gypsum; vermiculite; wood flour; alumina trihydrate; carbon black; metal oxides such as calcium oxide (lime), aluminum oxide, titanium dioxide, alumina hydrate, alumina monohydrate; and metal sulfites such as calcium sulfite.

Viscosity Enhancers

The make resin 112 of the abrasive article 100 has an advantageous formulation which delivers increased viscosity to the make coat prior to curing. This has the advantage of ensuring that the abrasive particles 114 remain in alignment prior to, and during, curing.

The make resin 112 for a P500 grit abrasive article of the present invention is as follows with percentages by weight:

| | |
|---|---|
| Phenol formaldehyde resin | 74% |
| EC1197 | 8.1% |
| EE364 | 0.25% |
| Alkyl quaternary ammonium clay | 0.83% |
| Water | 16.7% |

The make resin 112 for a P180 grit abrasive article of the present invention is as follows with percentages by weight:

| | |
|---|---|
| Phenol formaldehyde resin | 85.4% |
| EC1197 | 9.3% |
| EE364 | 0.3% |
| Alkyl quaternary ammonium clay | 0.96% |
| Water | 4% |

An example of an Alkyl quaternary ammonium clay used in the above formulations is Garamite 1958 produced by ALTANA AG of AbelstraBe 43, 46483 Wesel, Germany.

The addition of Garamite to the make resin serves to increase the viscosity of the make resin which allows the make coat to retain the mineral in alignment prior to, and during, curing.

By maintaining the alignment of the mineral, the cut and finish of the abrasive article of the present invention are improved over prior art abrasive articles.

Methods of Making

In one exemplary method of making the article 100, the make resin 112 is applied to the backing. Next, abrasive particles 114 are applied to the make resin 112, and the make resin 112 is hardened. Optionally, the mineral can be applied over the entire sheet and then removed from those areas that do not contain the make resin 112. The size resin 116 is then applied over the abrasive particles 114 and the make resin 112 and in contact with backing 102. Finally, the size resin 116 is hardened to provide the abrasive article 100.

In one embodiment, the mineral particles 114 can be deposited on the layer of make resin 112 using a powder coating process or electrostatic coating process. In electrostatic coating, the abrasive particles 114 are applied in an electric field, allowing the particles 114 to be advantageously aligned with their long axes normal to the major surface 104. In some embodiments, the mineral particles 114 are coated over the entire coated backing 102 and the particles 114 preferentially bond to the areas coated with the tacky make resin 112. After the particles 114 have been preferentially coated onto the make resin 112, the make resin 112 is then partially or fully hardened. In some embodiments, the hardening step occurs by subjecting the abrasive article 100 at elevated temperatures, exposure to actinic radiation, or a combination of both, to crosslink the make resin 112. Any excess particles 114 can then be removed from the uncoated areas of the backing 102.

What is claimed is:

1. An abrasive article comprising:
   a backing;
   a make resin contacting the backing;
   abrasive particles contacting the make resin; and
   a size resin contacting both the abrasive particles and the make resin,
   wherein the make resin includes an alkyl quaternary ammonium clay.

* * * * *

UNITED STATES PATENT AND TRADEMARK OFFICE
CERTIFICATE OF CORRECTION

PATENT NO. : 10,611,939 B2
APPLICATION NO. : 15/773232
DATED : April 7, 2020
INVENTOR(S) : Philip Hill et al.

Page 1 of 1

It is certified that error appears in the above-identified patent and that said Letters Patent is hereby corrected as shown below:

In the Specification

Column 1
Line 7, delete "Nov. 4, 2018," and insert -- Nov. 4, 2016, --, therefor.

Signed and Sealed this
Twenty-first Day of July, 2020

Andrei Iancu
*Director of the United States Patent and Trademark Office*